Sept. 22, 1931.   W. BUSS   1,824,424
EXTRACTOR
Original Filed Nov. 7, 1927
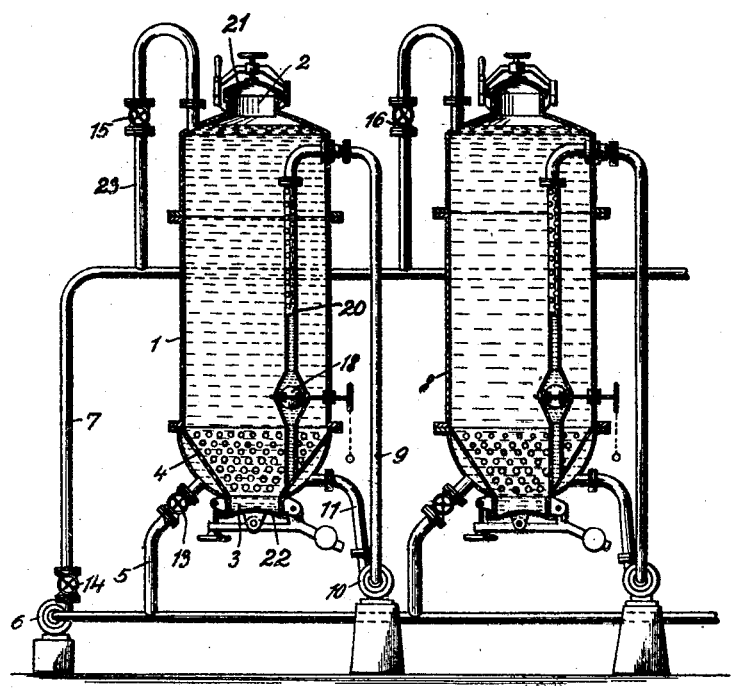
Inventor:
Walter Buss
by
Hika & Kehlinbeck
Attorneys.

Patented Sept. 22, 1931

1,824,424

UNITED STATES PATENT OFFICE

WALTER BUSS, OF BASEL, SWITZERLAND, ASSIGNOR TO BUSS AKTIENGESELLSCHAFT, OF BASEL, SWITZERLAND, A CORPORATION OF SWITZERLAND

EXTRACTOR

Original application filed November 7, 1927, Serial No. 231,657, and in Germany November 12, 1926. Divided and this application filed January 18, 1930. Serial No. 421,676.

My invention relates to improvements in extractors, such as are used for example for obtaining tanning material or dye-stuffs from wood or bark and fruits and the like. In extractors of this type the raw material is acted upon in a disintegrated state by hot water, so that a more or less concentrated solution of tanning material is obtained. For bringing the liquid into contact with the raw material the said liquid is moved through the extractor by means of a pump, until it has the desired degree of concentration, and thereafter it is removed by a special pump from the said extractor and conveyed into another apparatus, the liquid being removed from the bottom part of the extractor and through a strainer provided near the bottom. In apparatus such as are now in use the dimension of the strainer is comparatively small, so that much time is needed for removing the liquid from one extractor and conveying the same to another apparatus.

The object of the improvements is to provide an extractor of the class referred to, in which the liquid can be speedily removed from the extractor, and with this object in view my invention consists in providing one or more tubular strainers or filtering members extending through the inner part of the extractor. By means of the said tubular member or members the liquid is removed not only from the bottom part of the extractor but from all parts throughout the height thereof, and by providing the said tubular member or members the effective area of the strainer or filtering member is considerably increased.

A rapid operation of the extractor is important for the reason that ordinarily a single pump is provided for removing the liquid from a large number of extractors, so that the said pump must be able to empty one extractor within a limited period of time in order to be ready for connection with another extractor.

Another object of the improvements is to provide an extractor in which the liquid is not drawn alone from the same part of the charge of the extractor. By the rising concentration of the liquid the specific gravity thereof is varied, and the upper parts of the liquid have a lower degree of concentration than the lower layers. Therefore, the pump used for moving the liquid through the extractor takes in by suction only the parts of the liquid of lower concentration, and it is necessary frequently to operate the pump for driving the liquid through the extractor, and much time is accordingly needed for obtaining the desired degree of concentration. In my improved apparatus the aforesaid tubular filtering member or members is or are connected at their upper ends to the suction pipe of the pump provided for driving the liquid through the extractor, and the said filtering member is adapted to be closed at a predetermined point by a gate or valve which is closed when operating the pump for driving the liquid through the extractor, and which is opened when removing the liquid from the extractor and conveying the same to another apparatus. Therefore, while operating the pump for driving the liquid through the extractor, the liquid is uniformly drawn by suction from the whole body of the liquid, so that a liquid of uniform concentration is obtained; and much time is saved for the reason that the flow of the liquid is made more energetic, and the degree of concentration of the liquid is uniform.

Other objects of the improvements will appear from the following description.

The instant application is a division of another application filed by me in the United States Patent Office on November 7, 1927, Serial No. 231,657.

For the purpose of explaining the invention an example embodying the same has been shown in the accompanying drawing, which shows a sectional elevation illustrating two co-operating extractors.

In the example shown the extractor comprises a receptacle 1 which is provided at its top and bottom with tubular extensions 2 and 3 adapted to be closed respectively by lids 21 and 22, the extension 2 being provided for charging the extractor with the raw material, and the extension 3 being provided for removing the raw material. At the lower end of the extractor there is located a conical strainer or filtering member 4, below which strainer the suction pipe 5 of a pump 6, which includes a valve 13 is connected to the receptacle, said pump being designed for removing the liquid from the extractor 1 and conveying the same through a pipe 7 to another extractor 8, the said pipe 7 including valves 14 and 16. A branch pipe 23 including a valve 15 is connected with the top part of the extractor 1. To the top part of the extractor 1 the suction pipe 9 of a pump 10 is connected, the pressure pipe 11 of which is connected with the bottom part of the extractor 1, the object of the said pump being to circulate the liquid through the extractor 1. From the strainer 4 a tubular strainer or filtering member 20 rises substantially through the entire height of the extractor, and is connected at its upper end with the suction pipe 9 and opens at its lower end into the portion of the extractor located below the strainer 4 and communicating with the pipes 9 and 11. At an intermediate point preferably near its lower end the tubular strainer is provided with a valve or gate 18 by means of which the strainer 20 can be opened or closed from the outside of the apparatus.

The tubular strainer 20 is adapted to supplement the filtering action of the strainer 4 by filtering the liquid at points lengthwise of the extractors; in other words, said tubular strainer 20 constitutes an addition whereby the filtering area through which the liquid passes is increased.

The operation of the apparatus is as follows:

For circulating the liquid through the extractor 1 the pump 10 is operated, so that the liquid is taken from the top part and delivered into the bottom part of the extractor. When the liquid has the desired degree of concentration the pump 10 is stopped, the valves 13, 14 and 16 are opened, the pump 6 is started and the valve 15 is closed, the gate 18 being adjusted to open the strainer 20. Now the pump 6 takes the concentrated liquid from the bottom part of the extractor and conveys the same to the second extractor 8. At this stage the liquid is filtered not only by means of the strainer 4, but also by means of the tubular strainer 20. Thus the filtering area is increased, and the liquid is withdrawn not only from the bottom part of the extractor but also from the top part thereof, the liquid passing through the top part of the tubular strainer 20 flowing downwardly through the said strainer and to the pipe 5. Thus the extractor is emptied within a comparatively short period of time.

When circulating the liquid through the extractor the gate 18 as previously stated is closed. When, however, the gate 18 is open the circulating pump 10 takes the liquid from the tubular strainer 20, and it forces the same to the bottom part of the extractor and below the strainer 4. Thus the tubular strainer 20 has the function first to accelerate the operation of removing the liquid from the extractor 1 and conveying the same to the extractor 8, and second to permit the liquid to be taken by the circulating pump from different parts of the extractor.

The tubular strainer 20 being connected both to the suction pipe 9 and to the bottom strainer 4, the liquid can be taken from the top parts of the charge and flow to the bottom part of the extractor when operating the pump 6 for removing the liquid, so that the filtering area is materially increased. Further, when operating the circulating pump the liquid can be taken not only from the top part of the extractor but also from the bottom part thereof, so that the circulating operation is likewise effective.

In the example shown each extractor is provided with a single tubular strainer. But I wish it to be understood that I do not limit myself to this feature.

I claim:

1. Apparatus for making extracts or infusions by steeping comprising a container, a strainer in said container at the bottom thereof for filtering the liquid at the lower portion of said container, a tubular strainer extending lengthwise of said container and connected at its lower end with said bottom strainer, and a pump having its suction side connected with the upper end of said tubular strainer and its pressure side connected with said container.

2. Apparatus for making extracts or infusions by steeping comprising a container, a strainer in said container at the bottom thereof for filtering the liquid at the lower portion of said container, a tubular strainer extending lengthwise of said container and connected at its lower end with said bottom strainer, a pump having its suction side connected with the upper end of said tubular strainer and its pressure side connected with said container, a valve in said tubular strainer, and a second pump having its suction side connected with said container for removing concentrated liquid therefrom.

3. Apparatus for making extracts or infusions by steeping, comprising a plurality of containers arranged for passing the liquid therethrough in series, a strainer in each of said containers at the lower parts thereof, a tubular strainer extending lengthwise of each of said containers and connected at their lower ends with said bottom strainers, pumps having their suction sides connected with the upper ends of said tubular strainers and their pressure sides connected with said containers for circulating liquid therethrough, and another pump having its suction side connected with one container and its pressure side leading to an adjacent container for passing concentrated liquid from said one container to said adjacent container.

4. Apparatus for making extracts or infusions by steeping, comprising a plurality of containers arranged for passing the liquid therethrough in series, a strainer in each of said containers at the lower parts thereof, a tubular strainer extending lengthwise of each of said containers and connected at their lower ends with said bottom strainers, a valve in each of said tubular strainers, pumps having their suction sides connected with the upper ends of said tubular strainers and their pressure sides connected with said containers for circulating liquid therethrough, and another pump having its suction side connected with one container and its pressure side leading to an adjacent container for passing concentrated liquid from said one container to said adjacent container.

5. Apparatus for making extracts or infusions by steeping, comprising a plurality of containers arranged for passing the liquid therethrough in series, a strainer in each of said containers at the lower parts thereof, a tubular strainer extending lengthwise of each container through the material to be treated, said tubular strainers being joined at their lower ends to the bottom strainers and having their upper ends leading out of said containers, pumps having their suction side connected with the upper ends of said tubular strainers and their pressure sides connected with said containers for circulating liquid therethrough, and a pump having its suction side connected with one container and its pressure side connected with another container for passing concentrated liquor from one container to another.

In testimony whereof I have hereunto set my hand.

WALTER BUSS.